(12) United States Patent
Grant et al.

(10) Patent No.: US 9,790,922 B2
(45) Date of Patent: Oct. 17, 2017

(54) OVERRUN PROTECTION FOR WIND TURBINES

(71) Applicant: Orenda Energy Solutions Inc., Morrisburg (CA)

(72) Inventors: Christopher Grant, Skead (CA); David Vandermeer, Prescott (CA)

(73) Assignee: Orenda Energy Solutions Inc., Iroquois (CA)

( * ) Notice: Subject to any disclaimer, the term of this patent is extended or adjusted under 35 U.S.C. 154(b) by 547 days.

(21) Appl. No.: 14/323,376

(22) Filed: Jul. 3, 2014

(65) Prior Publication Data

US 2015/0014993 A1  Jan. 15, 2015

Related U.S. Application Data

(60) Provisional application No. 61/843,006, filed on Jul. 4, 2013.

(51) Int. Cl.
| | | |
|---|---|---|
| *F03D 7/00* | (2006.01) | |
| *F03D 7/02* | (2006.01) | |
| *F16H 61/4157* | (2010.01) | |

(52) U.S. Cl.
CPC ......... *F03D 7/0244* (2013.01); *F03D 7/0248* (2013.01); *F05B 2260/406* (2013.01); *F05B 2270/506* (2013.01); *F16H 61/4157* (2013.01); *Y02E 10/723* (2013.01)

(58) Field of Classification Search
CPC .. F16H 61/4157; F03D 7/0244; F03D 7/0248; F03D 7/0276; Y02E 10/723
USPC .................. 303/84.1; 188/266.2; 290/43, 44
See application file for complete search history.

(56) References Cited

U.S. PATENT DOCUMENTS

| | | | |
|---|---|---|---|
| 4,498,017 A | 2/1985 | Parkins | |
| 5,070,695 A | 12/1991 | Metzner | |
| 5,145,324 A | 9/1992 | Dickes et al. | |
| 6,254,197 B1 * | 7/2001 | Lading .................. | B60T 13/22 303/15 |

(Continued)

FOREIGN PATENT DOCUMENTS

| | | |
|---|---|---|
| CA | 2460923 A1 | 4/2003 |
| CN | 101586525 A | 11/2009 |

(Continued)

OTHER PUBLICATIONS

Plouffe, Gilbert; International Search Report from corresponding PCT Application No. PCT/CA2014/050631; search completed Sep. 12, 2014.

(Continued)

*Primary Examiner* — F. Daniel Lopez
*Assistant Examiner* — Dustin T Nguyen
(74) *Attorney, Agent, or Firm* — Blake, Cassels & Graydon LLP; Wilfred P. So

(57) ABSTRACT

A braking system for a turbine of a wind powered includes a hydraulic machine connected to a drive shaft of the turbine. A pressure regulating valve in the supply line of the hydraulic machine determines the pressure delivered to the supply line by the hydraulic machine. A control that is responsive to the speed of rotation of the drive shaft modulates the pressure regulating valve so as to increase pressure in the supply line as the rotational speed exceeds a predetermined speed to apply a braking force to the drive shaft.

30 Claims, 4 Drawing Sheets

(56) References Cited

U.S. PATENT DOCUMENTS

| | | | |
|---|---|---|---|
| 7,421,840 B2* | 9/2008 | Rose | B60T 10/04 |
| | | | 60/329 |
| 8,080,888 B1* | 12/2011 | Daley | B60K 25/02 |
| | | | 290/43 |
| 8,123,304 B2* | 2/2012 | Roed | F03D 7/0248 |
| | | | 303/2 |
| 8,181,455 B2 | 5/2012 | Tsutsumi et al. | |
| 2005/0279593 A1* | 12/2005 | Uphues | B60T 13/22 |
| | | | 188/170 |
| 2006/0210406 A1* | 9/2006 | Harvey | F03D 7/02 |
| | | | 417/334 |
| 2008/0164751 A1* | 7/2008 | Wedekind | F03D 7/0244 |
| | | | 303/22.1 |
| 2009/0058095 A1 | 3/2009 | McClintic | |
| 2009/0140522 A1* | 6/2009 | Chapple | F03D 7/02 |
| | | | 290/43 |
| 2009/0162202 A1* | 6/2009 | Nies | F03D 7/0244 |
| | | | 416/147 |
| 2010/0032959 A1 | 2/2010 | Nies | |
| 2011/0215738 A1 | 9/2011 | Kamen et al. | |
| 2013/0076040 A1* | 3/2013 | Tsutsumi | F03D 7/0244 |
| | | | 290/54 |
| 2014/0050579 A1* | 2/2014 | Perley | F03D 7/0248 |
| | | | 416/1 |

FOREIGN PATENT DOCUMENTS

| | | |
|---|---|---|
| EP | 0153882 A2 | 9/1985 |
| EP | 1722102 A1 | 11/2006 |
| EP | 2253842 A1 | 11/2010 |
| WO | 03098037 A1 | 11/2003 |
| WO | 2007053036 A1 | 5/2007 |
| WO | 2010032012 A1 | 3/2010 |
| WO | 2012028145 A1 | 3/2012 |

OTHER PUBLICATIONS

Supplemental European Search Report issued in corresponding EP application No. 14819800; search completed Feb. 8, 2017.

* cited by examiner

OVERRUN PROTECTION FOR WIND TURBINES

CROSS-REFERENCE TO RELATED APPLICATIONS

This application claims priority from U.S. Provisional Patent Application No. 61/843,006, filed on Jul. 4, 2013, the entire contents of which are incorporated herein by reference.

FIELD OF THE INVENTION

The present invention relates to braking systems for wind powered generators.

BACKGROUND OF THE INVENTION

A wind powered generator typically consists of a turbine having a propeller and drive shaft supported on a mast for rotation about a horizontal axis. The drive shaft is connected to an electrical generator so that rotation of the turbine produces electrical power from the generator. One of the fundamental characteristics of a wind turbine is that its rotational speed varies according to the prevailing wind conditions. Those wind conditions in term may vary dramatically over a short time, and it is therefore necessary to consider control of the turbine over a wide range of conditions.

The rotational speed of the turbine must be limited to maintain efficiency and to avoid excessive mechanical forces that might be imposed upon the blades of the propeller in the event of over speeding.

Larger turbine installations have sophisticated control systems that adjust the pitch of the blades to maintain the speed below the set limit. However, such installations are relatively expensive and require significant maintenance and are therefore not suitable for lower powered installations.

Other systems rely upon mechanical braking, or the movement of the blades to a less efficient position relative to the wind to limit the power generated.

PCT Application No. 2010/032012 shows a hydraulic drive system for use in a wind turbine in which the hydraulic drive is used to drive a generator and the rotational speed of the rotor is controlled so as to provide a constant rotational speed of the generator. Such a drive system, however, is relatively complex and, because flow of the fluid is constantly adjusted to regulate the speed, the drive system is subject to continuous hydraulic losses that render the overall efficiency of the system lower than that of a direct mechanical drive to a generator.

It is therefore an object of the present invention to provide a wind turbine in which the above disadvantages are obviated or mitigated.

SUMMARY OF THE INVENTION

According to the present invention there is provided a braking system for a wind turbine in which a hydraulic machine is connected to the turbine drive shaft. Fluid delivered by rotation of the machine is directed to a pressure regulating valve that is modulated to vary the set pressure delivered by the machine. As the rotational speed increases, the pressure is increased to apply a braking force to the drive shaft.

Preferably, energy absorbed passes through a cooler where it is dissipated as heat energy.

As a further preference, a mechanical brake operates on the shaft and is released by application of fluid pressure to the brake.

BRIEF DESCRIPTION OF THE DRAWINGS

Embodiments of the invention will now be described by way of an example only with reference to the accompanying drawings in which.

DETAILED DESCRIPTION OF THE INVENTION

Figure 1:
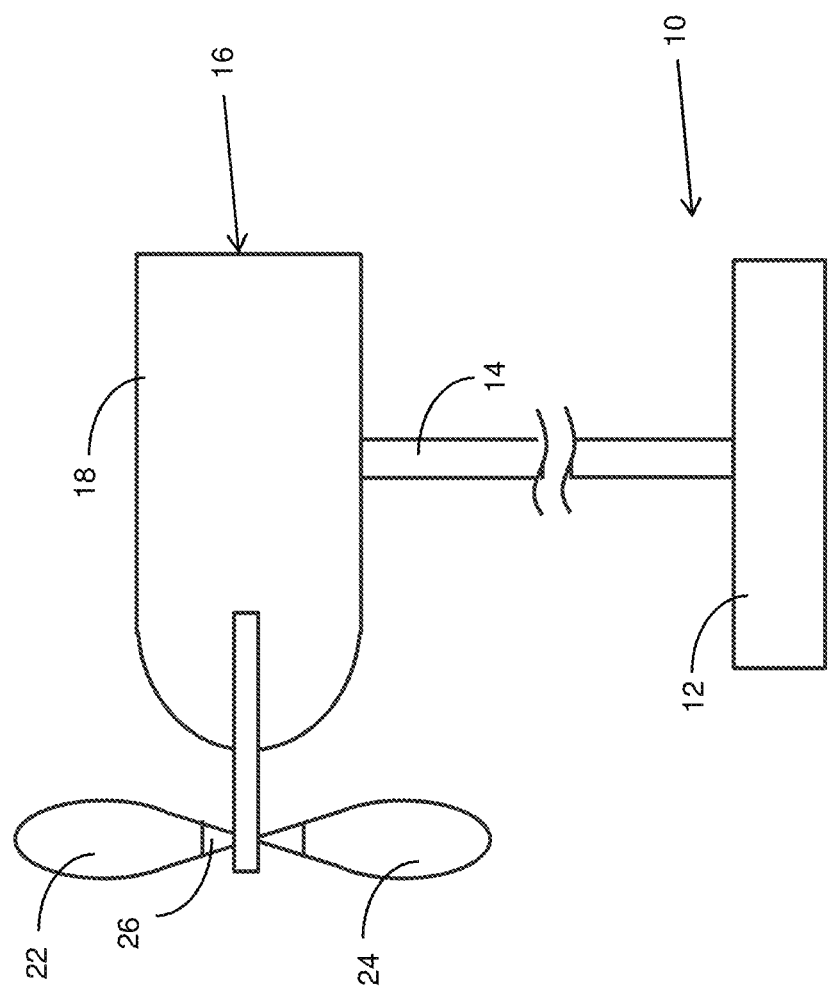
FIG. 1 is a schematic side view of a wind powered generator.

Referring therefore to FIG. 1, a wind powered generator 10 includes a base 12 with a mast 14 extending upwardly to support a turbine assembly 16. The turbine assembly 16 includes a streamlined nacelle 18 and a drive shaft 20 connected to a propeller 22. The propeller 22 has fixed blades 24 connected to a central hub 26, which is in turn connected to the drive shaft 20.

Figure 2:
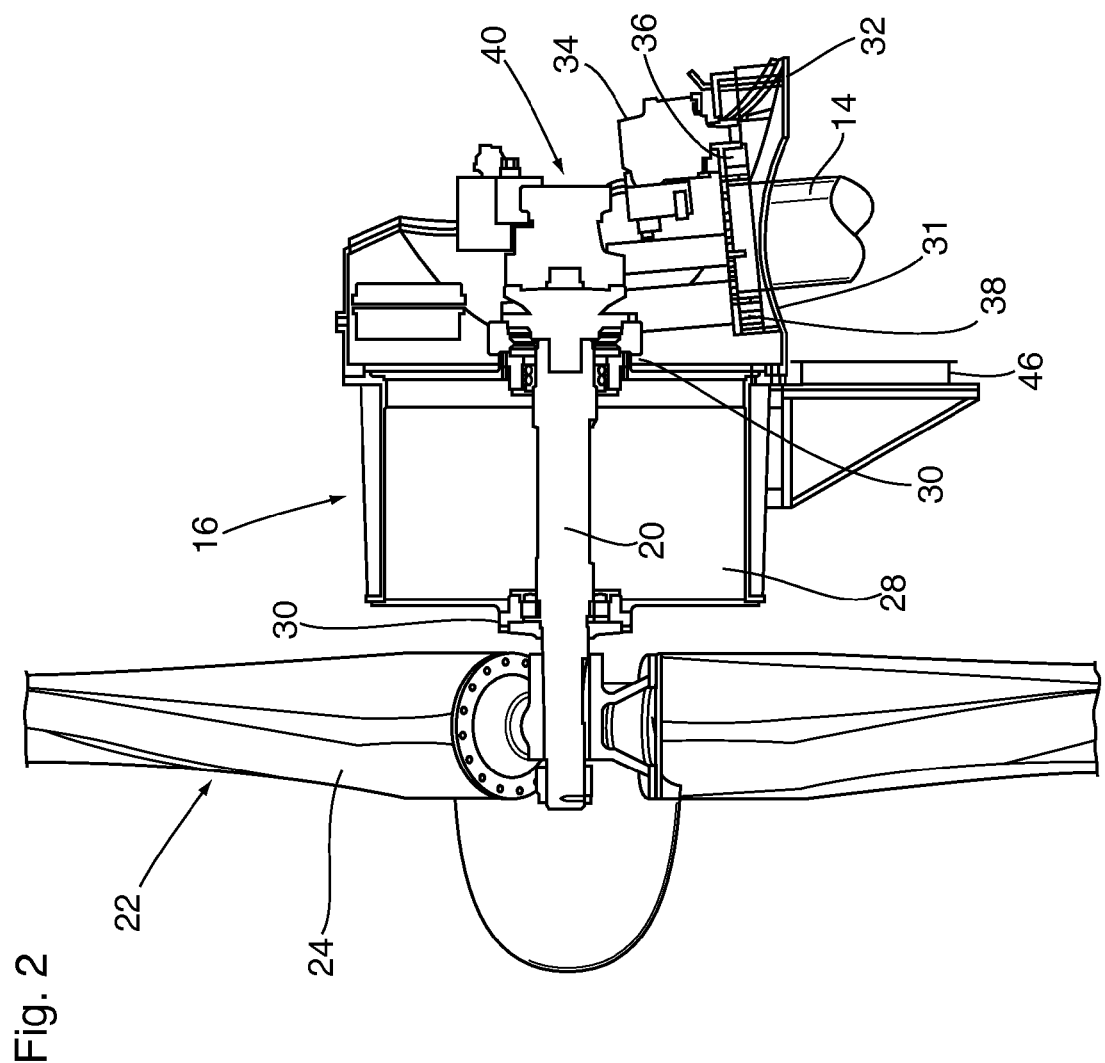
FIG. 2 is a section through the turbine of the generator of FIG. 1 on an enlarged scale.

As can be seen from FIG. 2, the drive shaft 20 is supported in a pair of spaced bearings 30 mounted on opposite end walls of a generator housing 28. The drive shaft 20 engages an armature of the generator 27 to rotate it within the housing 28 and generate electrical power, as is well known. A platform 32 extends rearwardly from the housing 28 and has an aperture 31 to receive an upper end of the mast 14. A bearing 33 is disposed about the aperture 31 to connect the mast 14 and turbine assembly 16 so it is rotatably mounted on the mast 14. A hydraulic yaw motor 34 is carried on the platform 32 and has a drive pinion 36 that meshes with a ring gear 38 mounted to the mast. The motor 34 is used to control rotation of the turbine assembly 16 about the vertical axis and adjust the disposition of the propeller 22 relative to the prevailing wind.

Figure 3:
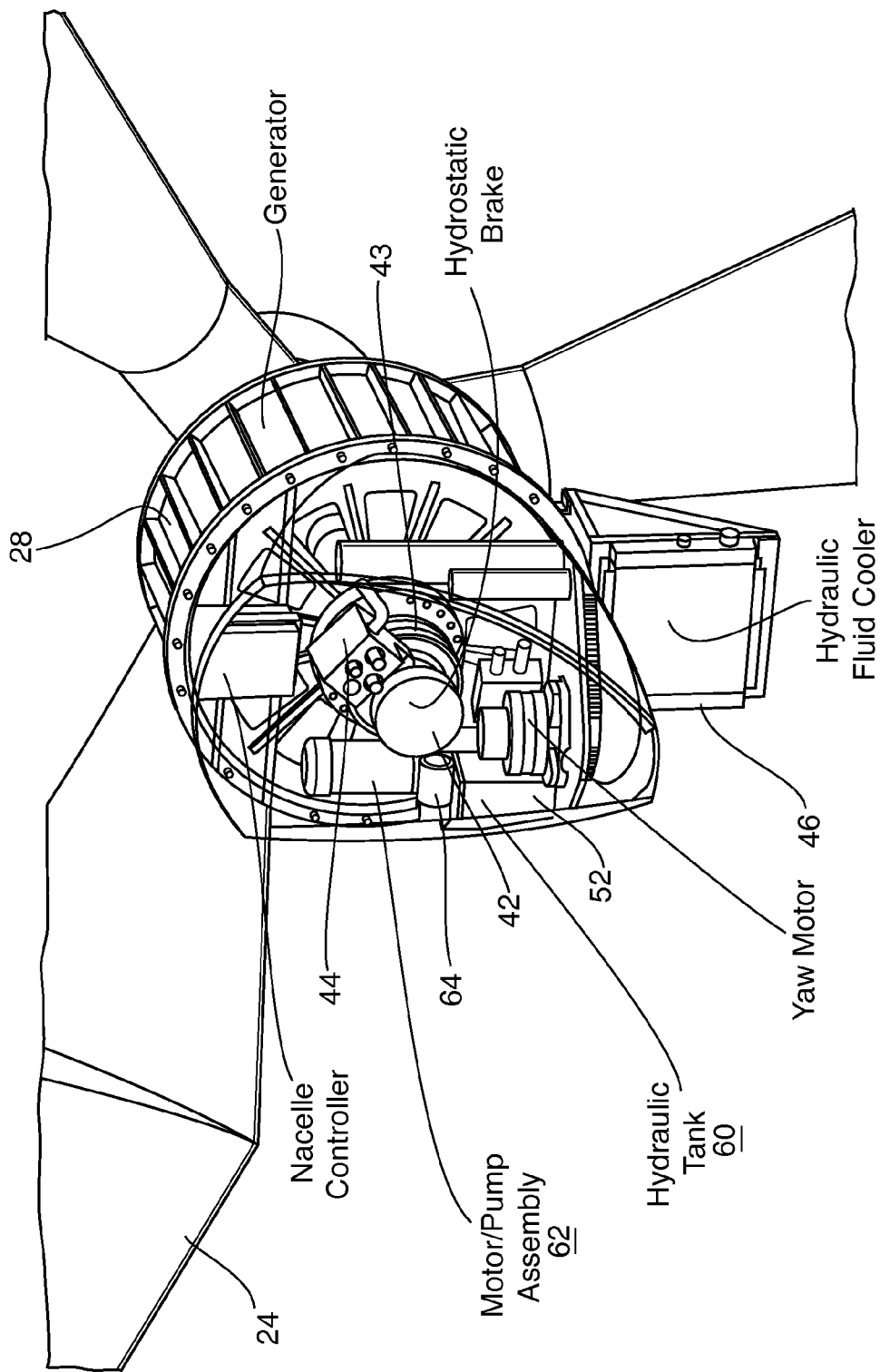
FIG. 3 is a rear perspective of the turbine showing the major component assemblies.

A brake assembly 40 is mounted on the rotor 20 at the opposite end to the propeller 22. The brake assembly 40 includes a hydraulic machine 42, a mechanical brake 43 and a control module 44 (FIG. 3). The hydraulic machine 42 may be a hydraulic pump, such as a gear pump, vane pump or radial piston pump that transfers fluid from an inlet to an outlet upon rotation of the drive shaft 20, of well known construction.

A pressure supply line 96 is connected to the outlet of the hydraulic machine and conveys fluid of a valve assembly 47. Fluid is returned to the inlet of the hydraulic machine 42 by a return conduit 49. A heat exchanger acting as a cooler 46 is located in the return conduit 49 and disposed beneath the generator housing 28 so as to be downstream of the propeller 22. The cooler 46 is located vertically so as to be normal to the airflow and in a position in which heat may be dissipated from the cooler 46 to the surrounding atmosphere.

Hydraulic fluid is delivered to the yaw motor 34 and brake assembly 40 through respective hydraulic lines 48. The line 48 is connected to a hydraulic power pack 52 supported on the platform 32.

As can be seen from FIG. 3, the power pack 52 includes a fluid reservoir 60 positioned next to a gear pump 62 that is driven by an electric motor 64. The platform therefore supports the operating components of the wind powered generator 10 in a convenient and self-contained manner.

Figure 4:
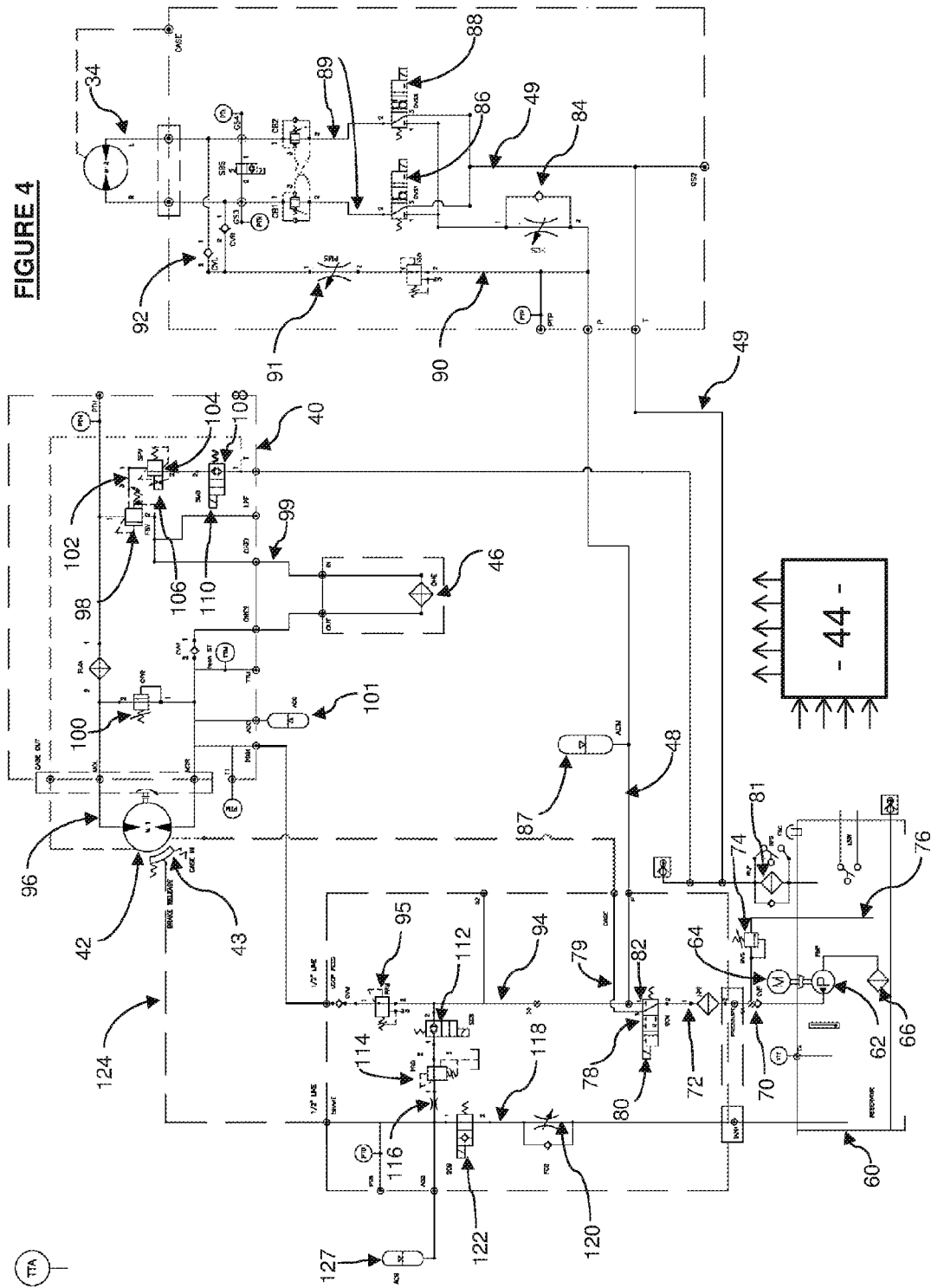
FIG. 4 is a hydraulic schematic of the control system implemented in the generator of FIG. 1.

The hydraulic interconnection and interoperability of the components can be seen from the schematic diagram of the hydraulic control circuit in FIG. 4. The pump 62 draws fluid from the reservoir 60 through a filter 66 and delivers the pressurized fluid through a check valve 70 to a main supply line 72. A pressure relief valve 74 protects the main supply line 72 from over pressure and returns fluid to the reservoir 60 through a drain line 76.

Flow from the main supply line is controlled by a two position bypass valve 78 (the transitioning condition is also indicated in the schematic) which is biased to a position in which all the flow in the supply line 72 is directed to a bypass line 79. The bypass line 79 directs the flow of fluid through the case of the brake assembly 40 to provide cooling of the hydraulic machine 42 and allow the pump 62 to run continuously at a relatively low pressure. The line 79 returns to the reservoir 60 through a filter 81.

The valve 78 may be moved by a solenoid 80 from the position in which flow is diverted to the bypass line 79, and thereby unloads the pump 62, to a position in which the output of the pump is connected directly to the supply port 82 of the valve 78. Fluid from the supply port 82 is connected to both the yaw motor 34 and the brake control 40. Supply line 48 extends from the supply port 82 through a flow limiting throttle 84 to the inlets of a pair of two position solenoid operated valves 86, 88 (again, the transitioning condition is also indicated on the schematic). A return line 49 is connected to the drain ports of the valves 86, 88 and returns to the reservoir 60 though filter assembly 81.

An accumulator 87 is included in the line 48 to ensure a continued supply of fluid in the event of power failure. The accumulator 87 also provides a source of pressurised fluid to the yaw valves 86, 88, allowing the yaw system to operate with the valve 78 in a position that circulates the flow of the pump 62 through the casing at low pressure.

Each of the valves 86, 88 has a supply line 89 connected to opposite sides of the yaw motor 34. Each of the valves 86, 88 is spring biased to a first position in which the supply port is connected to the drain port and may be moved by the associated solenoid through an intermediate position where both the inlet supply and drain ports are connected to a second position in which the valve directly connects the inlet port to the supply line 89. To inhibit cavitation in the supply lines connected to the yaw motor 34, a bypass line 90 is provided with a throttle 91 and check valves 92 that allow make up fluid to flow into the supply lines 89 to the yaw motor 34.

The supply port 82 of the valve 78 is also connected to a makeup line 94 connected to the brake circuit 40. A pressure reducing valve 95 is provided in the make-up line 94 that limits the make-up pressure supplied to the hydraulic machine 42 to below that of the system pressure set by valve 74 to inhibit cavitation.

The hydraulic machine 42 is connected in a hydraulic loop that includes pressure line 96, pilot operated flow valve 98 and cooler 46. The hydraulic machine 42 delivers fluid to a pressure line 96 that is connected to the inlet of a pilot operated flow valve 98. The outlet 99 from the valve 98 passes through the cooler 46 and is returned to the inlet of motor 42. The pilot port of valve 98 delivers fluid to conduit 102, which after having passed through valves 104 and 108, discharges to the return conduit 49.

A cross relief valve 100 provides a relief path in the event of reversal of the motor 42 under abnormal conditions. An accumulator 101 is included in the return conduit 49 for continued fluid supply in the event of power failure and to accommodate thermal expansion.

The pilot operated flow valve 98 is controlled by pilot pressure in conduit 102 which, in turn, is controlled by a proportional valve 104. The proportional valve 104 is electrically operated through a solenoid 106 to move the valve 104 against a bias from a closed position to an open position, and vary the pressure in the conduit 102. In the closed position, flow through the proportional valve 104 is restricted so maximum pressure is attained in the conduit 102. As the valve is moved to a fully open position with minimum restriction to flow, pressure decreases in the conduit 102. The pressure is applied as a pilot pressure to the valve 98 to adjust the pressure at which the flow valve 98 opens. Variation of the pressure in the conduit 102 therefore controls the pressure in the pressure line 96.

An override valve 108 is provided between the proportional valve 104 and the drain. The override valve is biased to a closed position and is movable from a closed to an open position by a solenoid actuator 110 that is controlled by the control 44. In the closed position, the valve 108 restricts flow hydraulically disables the proportional valve 104 to set the flow valve 98 to maximum system pressure. This provides redundant safety in the event of power failure to the control 44.

The flow through the makeup line 94 also supplies an actuator of mechanical brake 43 and flow to the mechanical brake 43 is controlled by a two position valve 112 biased to a closed position and moveable to an open position by an actuator controlled by the control 44. The pressure reducing valve 114 limits the maximum pressure that can be applied to the mechanical brake to less than that supplied by the motor 64. Flow through the pressure reducing valve 114 is controlled by an orifice 116, which is connected to a restricted drain line 118. Flow through the drain line 118 is, in turn, controlled by a variable orifice 120 and by a brake release valve 122. The brake release valve 122 is biased to an open position in which flow through the drain line 118 is permitted, but may be moved by a solenoid, under control of the control 44, to a closed position in which flow through the line is prevented by a check valve. The restricted drain line 118 is also connected to a brake release line 124 that supplies fluid to the actuator of the mechanical brake 43 and moves mechanical brake 43 out of engagement with the rotor 20. An accumulator 127 ensures a limited continued supply of pressurised fluid in the event of power failure. Accumulator 127 also ensures a supply of fluid to hold the mechanical brake 43 in an off condition when the valve 78 is switched to allow circulation of the pump 62 at low pressure.

Operation of the valves in the hydraulic circuit is provided through the electronic control 44 that may be any suitable form of control logic that receives input signals from sensors for rotation, wind speed, wind direction, and related parameters and implements a control strategy to operate upon the valves to achieve the operation described below.

Under normal conditions, the yaw motor 34 is controlled through the valves 86, 88 to rotate the turbine into the optimum direction relative to the wind. When the turbine is facing the optimum direction, both valves 86, 88 are positioned to prevent flow from the supply line 48 to the motor 34. If the wind direction changes, as sensed for example by a wind vane on the mast, the control 44 determines an adjustment is required and fluid is supplied from the pump 62 and supply line 48 to the valves 86, 88. One of the valves, for example 86, is moved to a position in which the supply is connected to one side of the motor 34 and the opposite side of the motor 34 is connected to drain. The motor 34 thus rotates and adjusts the position of the turbine on the mast. Until the optimum position is again attained.

Assuming that the turbine is rotating at the normal operating speed, the solenoid 106 maintains the valve 104 open so that pressure in the conduit 102 is minimal. The valve 98 is thus set to a minimum relief pressure and fluid in the hydraulic loop may flow from the pressure line 96 back to the inlet of pump 42 with minimum restriction. The override valve 108 is also maintained open to allow the pilot flow to return to the reservoir 60.

The valve 112 is also conditioned to a position in which flow passes to the brake release line 124 and the restricted drain 118. The valve 122 is closed to prevent flow to drain so that pressure builds up in the brake release line 124. This pressure is applied through the brake line 124, which releases the mechanical brake 126, moving it out of engagement with the rotor 20. The turbine is thus free to rotate under the influence of the wind.

If the control 44 senses an excessive rotational speed through a speed sensor associated with the turbine, i.e a rotational speed above a predetermined value, a signal is sent to the solenoid 106 and the valve 104 is operated to increase the pressure in the conduit 102. That pressure is applied against the valve 98, thereby increasing the pressure set by the valve and increasing the pressure in the conduit 96. An increased torque is applied to the drive shaft 20 to cause the motor 42 to deliver at a higher pressure. This brakes the rotation. A continued increase in speed leads to a further increase in pressure in the conduit 102 until the rotor is brought back to the required rotational speed. When the speed drops back to the normal range, due to increased braking, torque, or reduced wind velocity, the valve 104 reduces the pilot pressure and thereby the system pressure set by valve 98.

The hydraulic fluid is heated as it passes through the valve 98 and this energy is dissipated by the cooler 46, positioned in the air stream passing through the propeller 22. Even when the speed returns to a normal level, the fluid continues to circulate through the heat exchanger 46 where the energy absorbed by the fluid in passing through the restricted valve 98 is dissipated as heat to return the fluid to ambient conditions.

By modulating the position of the valve 104, the pressure in conduit 102 and thus the setting of valve 98 may be adjusted. In this manner, the load imposed by the motor 42 on the rotor may be adjusted to avoid over speeding of the rotor.

Should a power failure arise at the control 44, the valve 108 moves to a closed position, causing pressure in the conduit 102 to increase. The valve 98 is thus set to a high pressure to assert a high load on the rotor and avoid overspeeding of the propeller 22.

Prolonged operation at maximum system pressure will bring the drive shaft to a halt when required. The control 44 conditions valve 104 to a maximum pilot pressure position to again impose the maximum pressure drop across the valve 98 and halt rotation of the propeller.

When the rotor has stopped as seen by control 44, the valve 112 is moved to a closed position so that he continued supply of fluid to the restricted drain 112 is inhibited. The valve 122 is moved to an open position so the pressure in brake release have 124 is vented through the drain line 118. Fluid in the brake line 124 thus drains back to reservoir 60 allowing the brake 126 engage the rotor 20.

It will be seen therefore that the rotor may be directly mechanically connected to the generator and the braking function provided by the motor 42 is minimized under normal operating conditions. However, upon over speeding being detected, the valve 98 may be modulated to increase the load on the rotor, and thus prevent the over speeding. The excess energy being absorbed is dissipated as surplus heat through the cooler 46.

The cooler is conveniently positioned in the air stream from the propeller to maximise heat transfer and moves with the motor assembly so the air flow is always directed at the heat exchange.

The use of accumulators in the circuit ensures the availability of pressurised fluid without requiring the pump 64 to supply at high pressure and often fails safe operations of critical functions.

The invention claimed is:

1. A braking system for a turbine of a wind powered generator, said turbine having a propeller and a drive shaft connected to said propeller for rotation therewith, said braking system including a hydraulic machine connected to said drive shaft, an outlet from said hydraulic machine to deliver fluid to a supply line upon rotation of said drive shaft, a pressure regulating valve in said supply line to determine the pressure delivered to the supply line by said hydraulic machine, and a control responsive to the speed of rotation of said drive shaft to modulate said pressure regulating valve, said control modulating said pressure regulating valve to increase pressure in said supply line as said rotational speed exceeds a predetermined speed to apply a braking force to the drive shaft, and wherein said drive shaft is also connected to an armature of said wind powered generator to generate electrical power upon rotation of said drive shaft.

2. A braking system according to claim 1 including a mechanical brake operable upon said drive shaft, said mechanical brake being released by application of fluid pressure to said mechanical brake.

3. A braking system according to claim 2 wherein a pump supplies fluid to a brake actuator to release said mechanical brake.

4. A braking system according to claim 3 wherein a valve controls flow of fluid from said pump to said brake actuator of said mechanical brake, said valve being biased to a position in which flow is inhibited and being moved to a position in which flow is permitted by said control.

5. A braking system according to claim 4 wherein said brake actuator is connected to a drain and a brake release valve controls flow through said drain.

6. A braking system according to claim 5 wherein said brake release valve is normally open and is moved to a closed position by said control.

7. A braking system according to claim 6 wherein flow from said brake actuator to said drain is restricted.

8. A braking system according to claim 7 wherein an accumulator is connected to said brake actuator to maintain pressure in said actuator.

9. A braking system according to claim 1 wherein said pressure regulating valve is modulated by adjustment of a pilot pressure.

10. A braking system according to claim 9 wherein said pilot pressure is adjusted by an adjustable proportional valve biased to a position such that said pressure regulating valve attains a maximum pressure in said supply line and said control adjusts said adjustable proportional valve position to accordingly reduce the pressure attained in said supply line by said pressure regulating valve.

11. A braking system according to claim 10 wherein said control operates on a solenoid to adjust said bias.

12. A braking system according to claim 10 wherein an override valve is provided to hydraulically disable said adjustable proportional valve to cause said pressure regulating valve to maintain said maximum pressure.

13. A braking system according to claim 12 wherein said override valve is moveable from a first position in which flow through said adjustable proportional valve to a drain is enabled to a second position in which flow to said drain is inhibited.

14. A braking system according to claim 13 wherein said override valve is biased to said second position and is moved to said first position by an actuator controlled by said control.

15. A braking system according to claim 1 wherein fluid passing through said pressure regulating valve is returned to said hydraulic machine through a return conduit.

16. A braking system according to claim 15 wherein a heat exchanger is positioned in said return conduit.

17. A braking system according to claim 16 wherein said heat exchanger is positioned in the air flow passing through said propeller.

18. A braking system according to claim 15 wherein a hydraulic accumulator is connected to said return conduit.

19. A braking system according to claim 15 wherein hydraulic fluid is supplied to said return conduit from a hydraulic pump.

20. A braking system according to claim 19 wherein a pressure relief valve is connected between said pump and said return conduit to regulate flow there between.

21. A braking system according to claim 19 wherein said pump supplies fluid to a cooling circuit to cool said hydraulic machine.

22. A braking system according to claim 21 wherein a bypass valve directs fluid to said cooling circuit or to bypass said cooling circuit and said hydraulic machine.

23. A braking system according to claim 1 wherein a yaw control is provided to adjust the position of said turbine.

24. A wind powered generator having a mast, a turbine supported on said mast and including a propeller and a drive shaft connected to said propeller for rotation therewith, a generator having an armature connected to said drive shaft to generate electrical power upon rotation of said drive shaft, and a braking system for applying a torque to said drive shaft to inhibit rotation thereof, said braking system including a hydraulic machine connected to said drive shaft, an outlet from said hydraulic machine to deliver fluid to a supply line upon rotation of said drive shaft, a pressure regulating valve in said supply line to determine the pressure delivered to the supply line by said hydraulic machine, and a control responsive to the speed of rotation of said drive shaft to modulate said pressure regulating valve, said control modulating said pressure regulating valve to increase pressure in said supply line as said rotational speed exceeds a predetermined speed to apply a braking force to the drive shaft.

25. A wind powered generator according to claim 24 including a mechanical brake engageable with said drive shaft to inhibit rotation thereof, said mechanical brake being released upon application of hydraulic pressure thereto.

26. A wind powered generator according to claim 25 including a yaw motor to adjust the position of said turbine about a vertical axis.

27. A wind powered generator according to claim 25 including a platform mounted on said post to support said turbine and generator, said platform being adjustable by said yaw motor about said vertical axis.

28. A wind powered generator according to claim 27 wherein a heat exchanger is provided to cool hydraulic fluid in said braking system, said heat exchanger depending from said platform and in the airstream passing through said propeller.

29. A braking system for a turbine of a wind powered generator, said turbine having a propeller and a drive shaft connected to said propeller for rotation therewith, said braking system including a hydraulic machine connected to said drive shaft, an outlet from said hydraulic machine to deliver fluid to a supply line upon rotation of said drive shaft, a pressure regulating valve in said supply line to determine the pressure delivered to the supply line by said hydraulic machine, and a control responsive to the speed of rotation of said drive shaft to modulate said pressure regulating valve, said control modulating said pressure regulating valve to increase pressure in said supply line as said rotational speed exceeds a predetermined speed to apply a braking force to the drive shaft, wherein said pressure regulating valve is modulated by adjustment of a pilot pressure, and said pilot pressure is adjusted by an adjustable proportional valve that in turn affects the pressure attained in the supply line, and an override valve is provided to hydraulically disable said adjustable proportional valve to cause said pressure regulating valve to maintain a maximum pressure in said supply line.

30. The braking system of claim 29 wherein the adjustable proportional valve is biased to a bias position such that said pressure regulating valve attains said maximum pressure in said supply line and said control adjusts said adjustable proportional valve position to accordingly reduce the pressure attained in said supply line by said pressure regulating valve.

* * * * *